Dec. 15, 1953       S. McCONAHA, JR., ET AL       2,662,472
                RECEIPTING AND DEPOSITING MACHINE
Filed June 6, 1951                              2 Sheets-Sheet 2
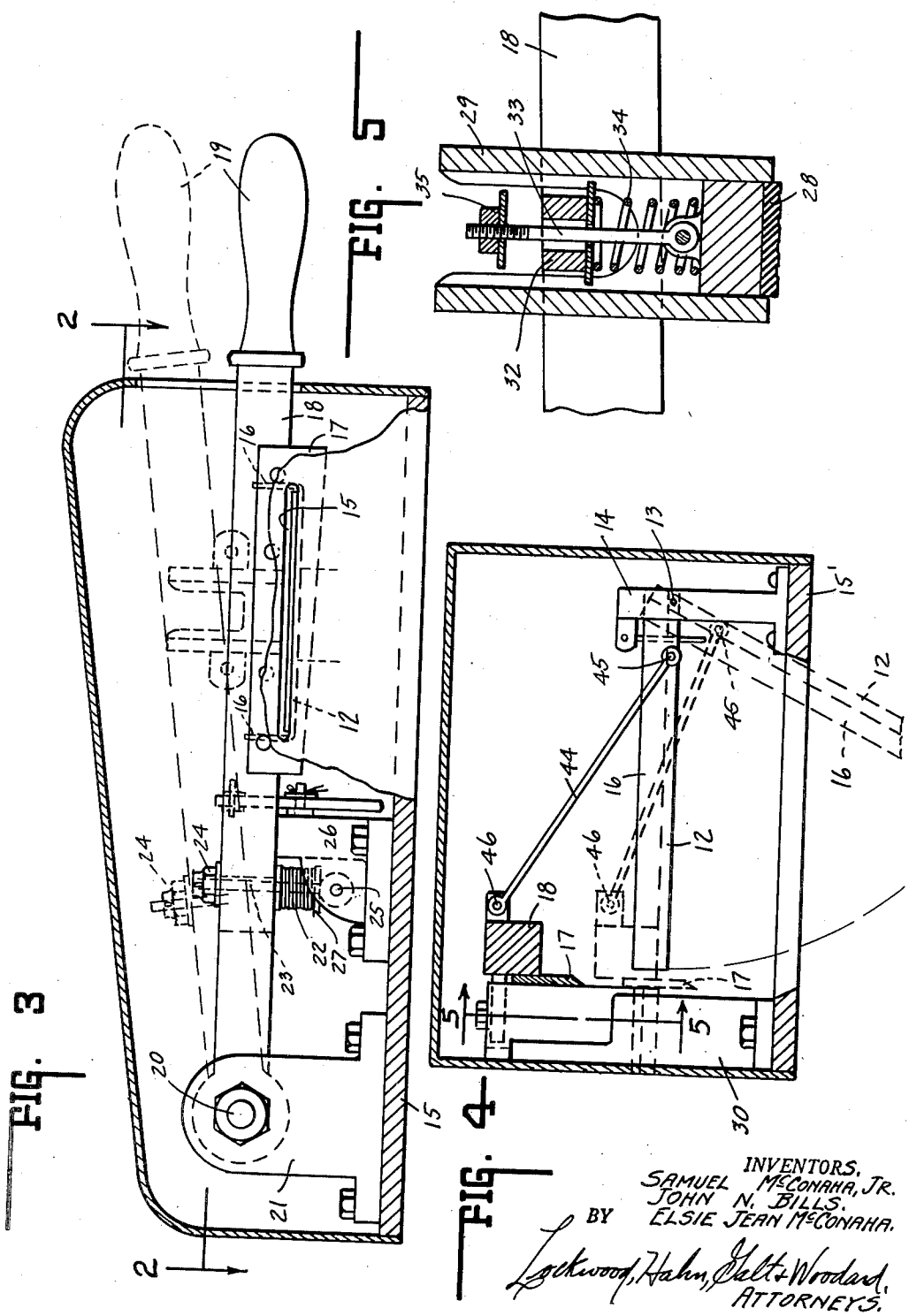

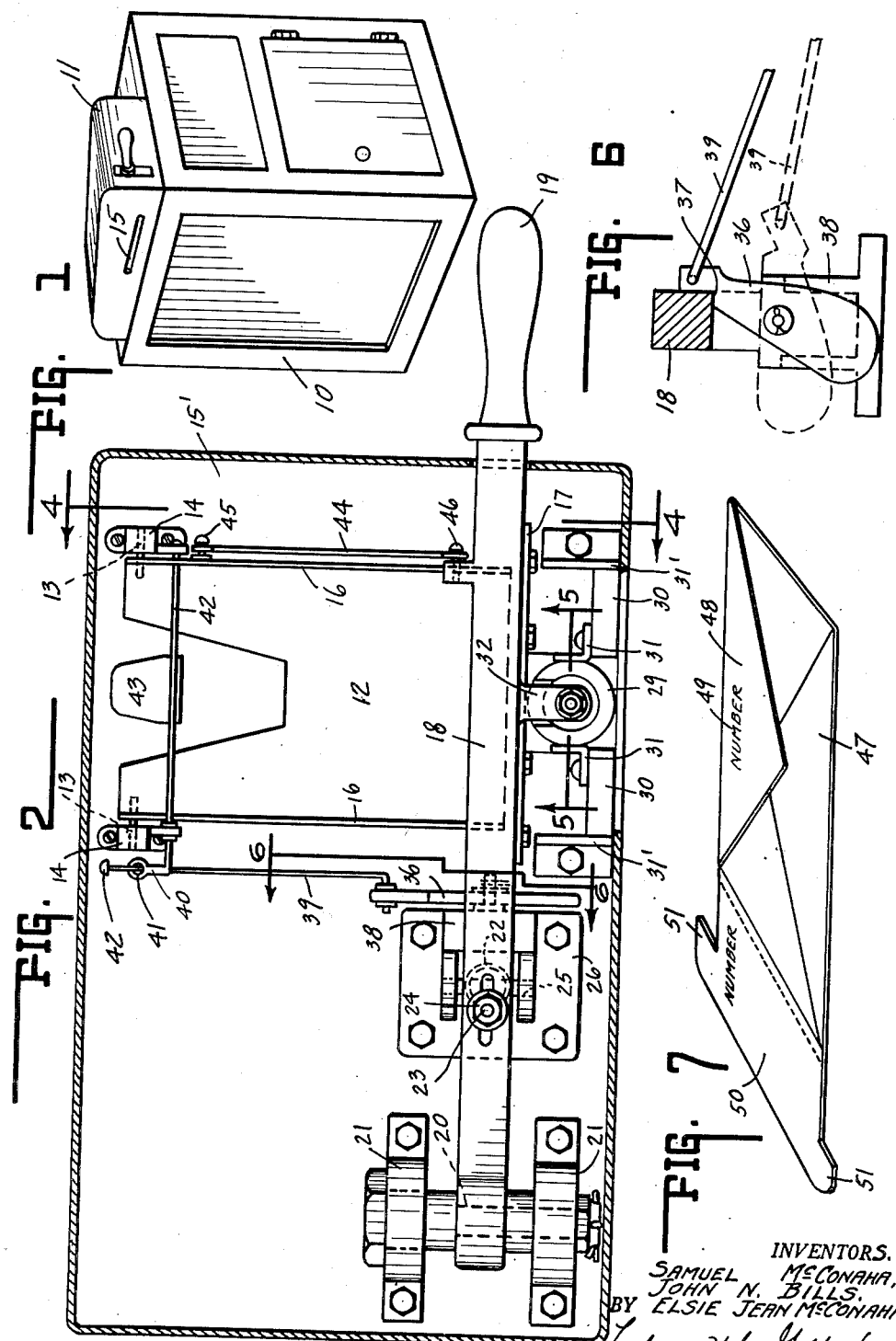

Patented Dec. 15, 1953

2,662,472

UNITED STATES PATENT OFFICE 2,662,472

RECEIPTING AND DEPOSITING MACHINE

Samuel McConaha, Jr., John N. Bills, and Elsie Jean McConaha, Indianapolis, Ind.

Application June 6, 1951, Serial No. 230,174

2 Claims. (Cl. 101—316)

The present invention relates to improvements in deposit receptacles for the reception of payment deposits in the payment of bills, deposits in banks and the like.

One of the principal objects of the invention is to provide a deposit receptacle for the receipt of payments for utility bills and the like and to provide means whereby when the depositor deposits the payment in the receptacle, a receipt for said payment is stamped and retained by the depositor.

A further object of the invention is to provide a receptacle adapted to receive an envelope or similar container in which payment for utility bills is sealed, and to provide means whereby a tab on said envelope may be severed therefrom after the envelope has been deposited in the receptacle, which tab has impressed thereon suitable indicia to act as a receipt for the envelope or container deposited.

It is not infrequent that utilities provide a branch recipient for the payment of utility bills. One important characteristic is that in numerous instances the recipients to whom said payments are made do not keep their accounts in the most meticulous manner; and as a result, frequent confusion arises with respect to the payment of these utility bills.

The present invention is designed to avoid such difficulties by the provision of a suitable envelope or other receptacle in which the customer may place the necessary amount for the payment of the bill, together with the bill, seal the same and deposit the same in a suitable receptacle. This envelope is provided with a receipt tab forming a portion thereof, and the receptacle is so designed and arranged that when the envelope is deposited in the receiving receptacle, this receipt tab will remain in the exterior of this receptacle, be stamped with suitable indicia, and severed from the container, which container will then be permitted to drop into the receiving receptacle. Preferably, the envelope and the tab are provided with suitable identifying data, such for instance as a number, the number on the tab corresponding to the number on the envelope, so that there will be no question as to what receipt applies to which envelope.

For the purpose of disclosing the invention an embodiment thereof is shown in the accompanying drawings in which:

Fig. 1 is a perspective view of a safe or other depository provided on its top with an apparatus for receiving and depositing an envelope in the safe.

Fig. 2 is a longitudinal sectional view taken on the line 2—2 of Fig. 3 looking in the direction of the arrows.

Fig. 3 is a vertical sectional view of the structure illustrated in Fig. 2.

Fig. 4 is a sectional view taken on the line 4—4 of Fig. 2.

Fig. 5 is a detail sectional view of the indicia stamp.

Fig. 6 is a detail sectional view of the knife tripping mechanism, and

Fig. 7 is a perspective view of the type of envelope which may be used in connection with the device illustrated.

There is preferably provided a safe or other container 10, which has mounted thereon the receiving, severing, and dating mechanism contained in a casing 11. This casing 11 provides a self-contained structure which may be secured by any suitable means on the top of the safe or container 10, an opening being provided in the top of the safe 10 to permit the deposit therein of the severed portion of the envelope as hereinafter described.

Within the container or casing 11 there is mounted a receiving platform 12 hingedly supported at its rear end on hinges 13, the bearings 14 for which are secured to the bottom 15' of the container 11. This platform 12 is supported above an opening in the bottom 15', which opening coincides with a top opening in the top of the safe 10 so that as the platform is swung downwardly on its hinges 13; an envelope or similar device will slide off of the platform and into the safe. One wall of the casing 11, preferably the side wall, is provided with a slot 15 which is opposite the free end of the platform 12, so that an envelope or like device, when inserted in the slot, will be deposited on the top of the platform 12. The platform is preferably provided with upwardly extending side flanges 16, which guide the deposited envelope in a right line direction toward the rear. A severing blade 17 is adapted to be reciprocated across the slot on the inner face of the wall in which the slot is adapted to be formed, and this blade is mounted on an oscillating bar 18, the handle 19 of which projects through a slot in the front wall of the casing 11. The bar 18 is pivotally mounted as at 20 on a vertical standard 21 fastened to the bottom 15 of the container. This bar 18 and its handle 19 are biased in a retracted or upright position through the medium of a coiled spring 22 interposed between the bar 18 and a bottom stop. The spring is adapted to surround a guide pin 23, which extends through an opening in the rod and receives at its upper end a stop nut 24. The lower end of the rod 23 is pivotally mounted as at 25 in a bracket 26 mounted on the bottom 15, and a bottom stop washer 27 provides a bottom stop for the coiled spring 22.

As the handle descends it operates a stamp 28 which is guided in a relatively stationary cylindrical member 29 supported from the front wall of the container by the supporting blocks 30 of the carrying angles 31, which are secured to the guide 29. These blocks 30 are likewise secured between vertically extending angles 31 fastened to the bottom 15'. The handle 18 carries a slotted extension 32 through which is adapted to pass an operating rod 33 pivotally secured to the top of the stamp 28. This operating rod has interposed therebetween at the top of the stamp 28 a coiled spring 34 whereby as the arm 18 is moved downwardly, resilient pressure will be exerted against the stamp 28 to force the same downwardly. The top end of the rod 33 is provided with a stop nut 35 which causes the stamp 28 to move upwardly with the operating arm 18 as the operating arm is moved to its normal or raised position.

To prevent the handle from being manipulated except when an envelope container is inserted in position, we provide a pivoted stop 36 normally biased in a position to place the shoulder 37 thereon beneath and in engagement with the operating arm 18 when the arm is in its elevated position. This pivoted stop is mounted on a bracket 38 extending upwardly from the bottom 15'. The top end of the stop is connected by a rod 39 having a lost motion connection with a trip arm 40. This lost motion connection comprises an eye 41 on the end of the trip arm 40, and a headed stop 42 on the end of the rod 39. The arm 40 is mounted at one end on a pivoted rod 42 pivoted between the side flanges 16 of the platform 12, and on this rod 42 there is provided a tongue 43 which normally lies in the path of the envelope to be inserted or deposited on the platform. The arrangement is such that when the envelope is pushed into the slot and to the extreme limit of its movement, the rear edge of the envelope contacting the tongue 43 will rock the rod 44 and with it the arm 40, thereby pulling the trip 36 from beneath the arm 18 permitting the arm to descend. The weight of the bottom portion of the trip 36 is such that it will normally restore itself to locking position after the envelope is discharged from the platform.

As has heretofore been mentioned, the platform 12 is pivotally mounted at its rear end so that its front end is free and may be swung downwardly to discharge the envelope deposited thereon. In order to swing the platform downwardly, a rod 44 has one end connected adjacent the rear end of the platform, but in front of its pivotal point as at 45. This connection merely comprises a pin connection, the pin being fastened to one of the flanges 16 of the platform and passing through an eye on the end of the rod. The opposite end of the rod has a like pin and eye connection 46 with the arm 18 so that as the arm is moved downwardly, the platform will be tilted downwardly, thereby discharging the severed portion of the envelope into the safe 10. As the arm 18 is moved upwardly under the influence of the spring 22, of course the platform will be raised to its receiving position again.

We have illustrated in Fig. 7 a particular form of envelope which is especially adapted for use in connection with the structure disclosed. This envelope consists of an envelope container 47 having a foldable flap 48, which after the money and bill are deposited in the envelope, may be sealed. An identifying number or other indicia is printed on the envelope as at 49. One end of the envelope has secured thereto a tab 50 which may form a part of the material of the envelope itself. This tab 50 has a number or identification material corresponding to the number or identification 49 thereon and is provided with laterally extending stop ears 51, which project beyond the sides of the tab and provide stops for preventing the envelope and its tab from being inserted beyond a certain point through the slot.

In operation, the depositor after having first placed the money and bill in the envelope and sealing the same, inserts the envelope through the slot 15 until the ears contact the side wall and prevent further movement of the envelope in the slot. The envelope is thus deposited upon the platform 12 and when moved to the extreme limit of its insertable position contacts the ear 43 causing the lock 36 to release. Under these circumstances the handle and arm 18 may be depressed causing the knife 17 to sever the tab 50 from the envelope, and at the same time impressing the predetermined indicia on that portion of the tab within the casing. At the same time the platform is tilted downwardly discharging the severed envelope into the safe 10, and the customer may remove the tab 50 as a receipt for the envelope deposited. As soon as the handle 19 is released, the arm under the influence of the spring 22 will return to normal position, returning the platform to its normal, horizontal receiving position, and permitting the lock 36 to move back into its locking position.

The invention claimed is:

1. In combination a closed receptacle having a deposit slot in a wall thereof, a supporting platform movably mounted within said receptacle opposite said slot for the reception of a deposited container; a reciprocating severing blade reciprocable past said slot for severing that portion of a container deposited on said platform from the remaining portion of the container; a stamp including a shaft connected with said blade for printing predetermined indicia on that portion of the container unsupported by said platform; a rod connected with the blade and the platform for effecting the operation of the platform to discharge therefrom the supported portion of the container, a stop normally in the way of said blade, and a tongue operatively connected to said stop for engagement by the container when deposited on said platform for controlling the operation of said stop to release said severing blade.

2. In combination a closed receptacle having a deposit slot in a wall thereof; a platform pivotally supported within said container and having a free end disposed opposite said slot; a reciprocating knife reciprocable between the end of said platform and the wall of the receptacle; stop means normally in the way of movement of said knife in the severing direction; tripping means including a tongue connected to said stop and operated by the insertion of a container through said slot on to said platform for tripping said stop to permit a free movement of said knife in a severing direction; means operated by the movement of said knife in a severing direction for printing predetermined indicia on a severed portion of the container, and a rod connected between said knife and said platform operated by said severing movement of the knife for tilting the free end of said platform downwardly to discharge the severed portion of the container resting thereon.

SAMUEL McCONAHA, Jr.
JOHN N. BILLS.
ELSIE JEAN McCONAHA.

References Cited in the file of this patent

UNITED STATES PATENTS

| Number | Name | Date |
|---|---|---|
| 1,109,646 | Stasiak | Sept. 1, 1914 |
| 1,506,491 | Kline | Aug. 26, 1924 |
| 2,105,660 | Kirshner | Jan. 18, 1938 |
| 2,169,322 | Keane et al. | Aug. 15, 1939 |
| 2,299,042 | Soper | Oct. 13, 1942 |
| 2,400,510 | Hofer | May 21, 1946 |